UNITED STATES PATENT OFFICE.

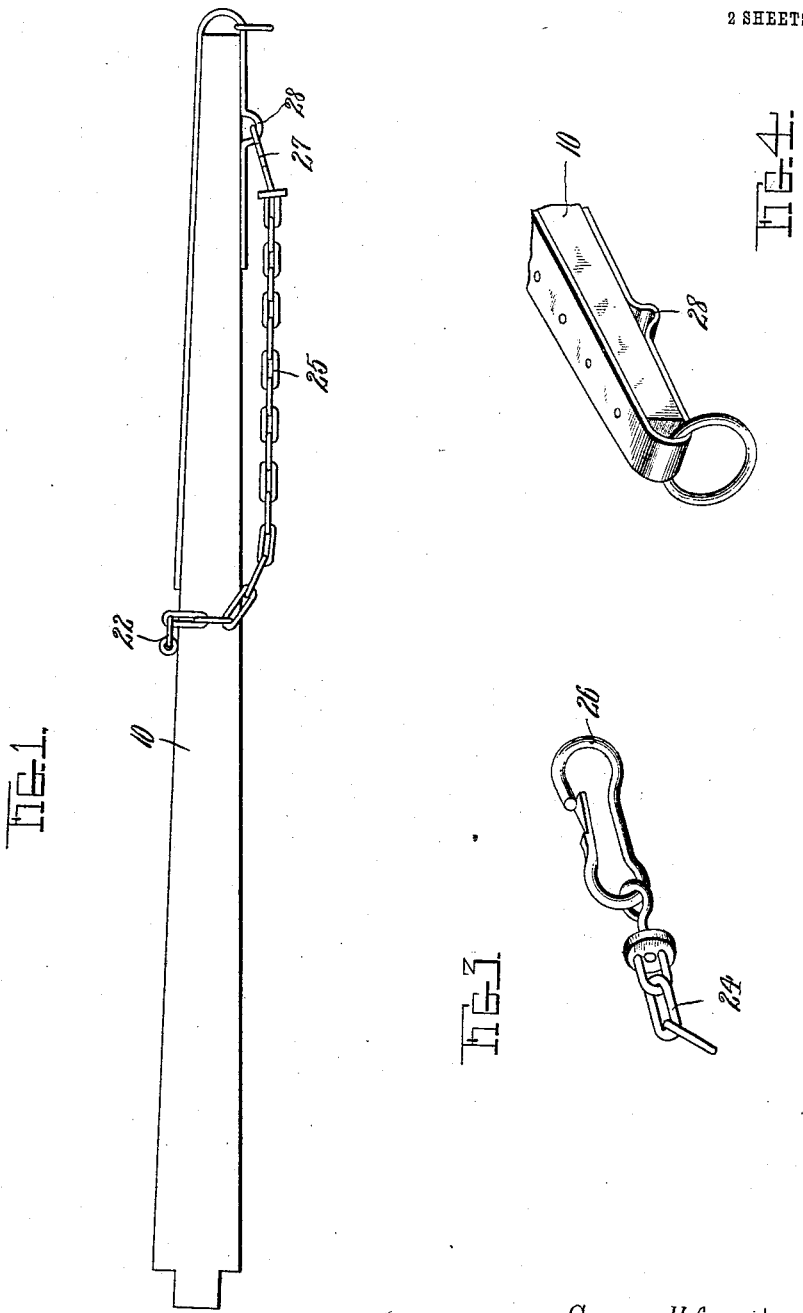

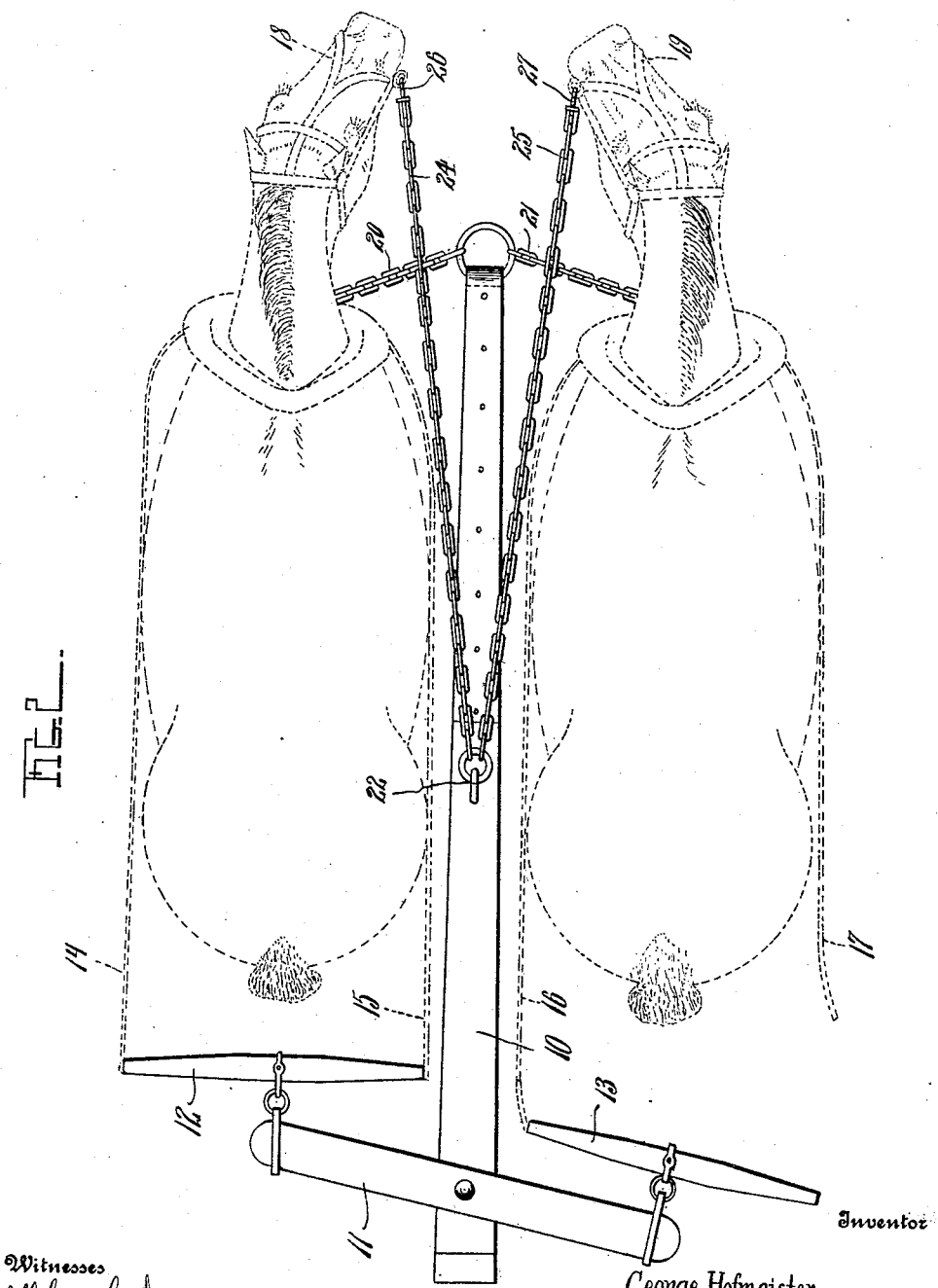

GEORGE HOFMAISTER, OF UNION CENTER, WISCONSIN.

WAGON-TONGUE ATTACHMENT.

No. 908,672.  Specification of Letters Patent.  Patented Jan. 5, 1909.

Application filed April 28, 1908. Serial No. 429,595.

*To all whom it may concern:*

Be it known that I, GEORGE HOFMAISTER, a citizen of the United States, residing at Union Center, in the county of Juneau, State of Wisconsin, have invented certain new and useful Improvements in Wagon-Tongue Attachments; and I do hereby declare the following to be a full, clear, and exact description of the invention, such as will enable others skilled in the art to which it appertains to make and use the same.

This invention relates to devices for preventing horses from moving when the driver is absent, and has for one of its objects to provide a simply constructed device whereby any attempt of the horses to move forward will draw their heads together and thus effectually prevent further forward movement.

Another object of the invention is to provide a simply constructed device attachable to the draft tongue and disposed out of the way when not in use, and adapted to be coupled to the head stalls of the horses, and operating to draw their heads together at any attempt at forward movement, and thus check further forward movement.

With these and other objects in view the invention consists in two flexible members, such as chains, connected to the draft tongue at a distance from its forward end and adapted to be coupled at their free ends to the head stalls of the harnesses, preferably by "snaps" to the bit rings. Then by simply unhitching one of the tugs from one of the swingle-trees, the double-tree will be free to swing upon the tongue, which will leave the horses free to move forwardly a short distance independently of the tongue, but any movement of this kind will cause the flexible members to draw the horses' heads together and thus effectually check any further forward movement.

In the drawings illustrating the preferred embodiment of the invention, Figure 1 is a side view of a portion of a wagon tongue with the improved attachment shown thereon. Fig. 2 is a diagrammatic view from above, of a team of horses, a draft tongue, and the double-tree and swingle-trees together with outlines of the tugs or traces, with the improved attachment applied. Fig. 3 is a perspective view of a portion of one of the draw elements. Fig. 4 is a perspective view of the forward end of the tongue showing its construction.

The tongue is represented at 10, the double-tree at 11, the swingle-trees at 12—13, the traces or tugs at 14—15—16—17, the head stalls at 18—19 with the usual bit rings, and the yoke chains between the tongue and the collars of the horses at 20—21, all of these parts being of the usual construction.

Attached at 22 to the tongue 10 are two flexible members, preferably chains 24—25, with means at their outer ends for detachable coupling to the head stalls 18—19, the coupling means being preferably snaps 26—27 engaged with the bit rings. The chains when not in use are "snapped" into the yoke stop, or a special loop as at 28 may be attached to the tongue when the yoke stop is not available.

In tongues where the yoke element is in the form of chains, an eye or loop device is employed at the outer end of the tongue in which the yoke chains are coupled, and in tongues of this class, this eye or loop is utilized to hold the flexible members when not in use, but in tongues not supplied with such loops a special loop will be provided, as represented at 28. It will thus be obvious that while the tugs are coupled to the swingle-trees, the tongue and the horses will move forwardly together, and the flexible members 24—25 will also move forwardly with the other parts, and remain inoperative, but as above stated, if one of the tugs be uncoupled, any forward movement of the horses thereafter will swing the double-tree upon the tongue leaving the tongue unmoved and likewise holding the rear ends of the flexible members immovable, and causing the heads of the horses to be drawn together and effectually checking any further forward movement.

The members 24—25 may be of any suitable material, such as straps, cords, chains, or the like, and it is not desired therefore to limit the invention to any particular form or material for these portions of the improved device.

What is claimed, is:—

1. The combination with a vehicle draft tongue, of two flexible members connected to the tongue rearwardly of its forward end and with means at the outer ends of the flexible members for coupling to the head stalls of the horses.

2. The combination with a vehicle draft tongue, of two flexible members connected to the tongue rearwardly of its forward end and with means at the outer ends of the flexible members for coupling to the bit rings of the horses.

3. The combination with a draft tongue, a double-tree and its swingle-trees swinging upon the tongue, the harness including the head stalls, and the traces adapted to be detachably coupled to the swingle-trees, and two flexible members connected at one end to the tongue and with means at the other ends for connecting respectively to the head stalls.

In testimony whereof, I affix my signature, in presence of two witnesses.

GEORGE HOFMAISTER.

Witnesses:
HENRY KAUFFMAN,
HUGO HUGEVAH.